United States Patent [19]

Kim et al.

[11] Patent Number: 5,403,626
[45] Date of Patent: Apr. 4, 1995

[54] PROCESS FOR PREPARING HYDROPHILIC POLYMER FILMS AND APPARATUS THEREOF

[75] Inventors: Young H. Kim; Jae W. Kim; Jeong W. An; Woog Y. Lee, all of Cheonlabuk-Do, Rep. of Korea

[73] Assignee: Sam Yang Co., Limited, Seoul, Rep. of Korea

[21] Appl. No.: 128,194

[22] Filed: Sep. 29, 1993

Related U.S. Application Data

[60] Continuation-in-part of Ser. No. 909,720, Jul. 7, 1992, abandoned, which is a division of Ser. No. 766,340, Sep. 27, 1991, Pat. No. 5,275,663.

[30] Foreign Application Priority Data

Sep. 27, 1990 [KR] Rep. of Korea .................. 90-15402
Sep. 29, 1990 [KR] Rep. of Korea .................. 90-15876
Sep. 29, 1990 [KR] Rep. of Korea .................. 90-15877
Jun. 18, 1991 [KR] Rep. of Korea .................. 91-10041

[51] Int. Cl.$^6$ .............................................. B05D 3/06
[52] U.S. Cl. ......................... 427/519; 427/519; 427/520; 427/536; 427/539
[58] Field of Search ............ 427/495, 517, 519, 520, 427/534, 536, 539, 540

[56] References Cited

U.S. PATENT DOCUMENTS

| | | | |
|---|---|---|---|
| 4,265,976 | 5/1981 | Nowak | 428/486 |
| 4,338,269 | 7/1982 | Russell | 264/22 |
| 4,468,412 | 8/1984 | Fujii et al. | 427/38 |
| 4,557,975 | 12/1985 | Moore | 428/412 |
| 4,774,035 | 9/1988 | Carmelite et al. | 264/1.4 |

FOREIGN PATENT DOCUMENTS

| | | |
|---|---|---|
| 52-40556 | 3/1977 | Japan . |
| 57-98578 | 6/1982 | Japan . |
| 57-147525 | 9/1982 | Japan . |
| 57-147526 | 9/1982 | Japan . |
| 60-137639 | 7/1985 | Japan . |

OTHER PUBLICATIONS

Kirk-Othmer Encyclopedia of Chemical Technology, vol. 23, Third Edition, pp. 615-627, 1979.
"Factors Affecting Photografting of Methacrylic Acid on Polyethylene Film in Liquid Phase System" by Y. Ogiwara et al, Journal of Applied Polymer Science, vol. 35, 1473-1481 (1988) no month given.
"Surface Photografting, 2a) Modification of Polypropylene Film Surface by Graft Polymerization of Acrylamide b)" by S. Tazuke et al, Makromol. Chem., 179, 2603-2612 (1978) no month given.
"Physico-chemical modifications of superficial regions of low-density polyethylene (LDPE) film under corona discharge" by B. Catoire et al, Polymer, 1984, vol. 25, Jun.

Primary Examiner—Shrive Beck
Assistant Examiner—Erma Cameron
Attorney, Agent, or Firm—Birch, Stewart, Kolasch & Birch

[57] ABSTRACT

A process for preparing a hydrophilic polymer film comprising coating a photopolymerization solution which comprises a hydrophilic monomer of lower water swelling ability and a UV stabilizer, on the film surface pre-treated with high frequency, and photopolymerizing the solution so as to improve the hydrophilic property, climate-resistability, and blocking property of the polymer film.

2 Claims, 2 Drawing Sheets

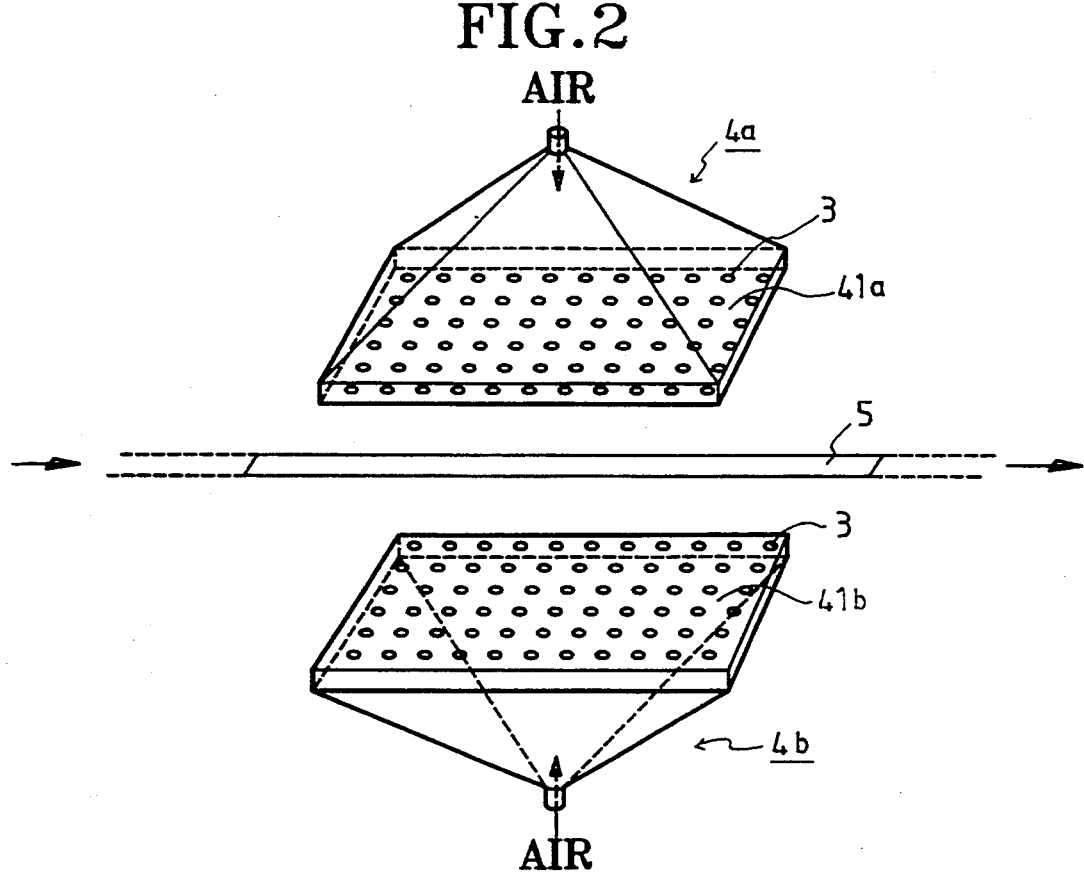
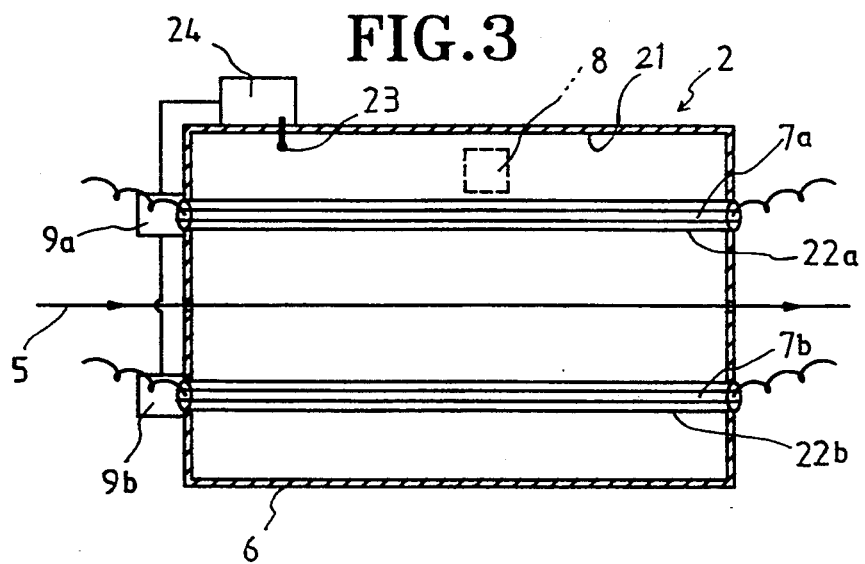

PROCESS FOR PREPARING HYDROPHILIC POLYMER FILMS AND APPARATUS THEREOF

This application is a continuation-in-part of application Ser. No. 07/909,720, filed on Jul. 7, 1992, abandoned, which is a Rule 60 divisional application of Ser. No. 07/766,340, filed Sep. 27, 1991, now U.S. Pat. No. 5,275,663, the entire contents of which are hereby incorporated by reference.

BACKGROUND OF THE INVENTION

1. Field of the Invention

The present invention relates to a process for preparing a hydrophilic polymer film, and particularly, to a process for the preparation of a hydrophilic polymer film which comprises modifying the polymer film, by coating a photopolymerization solution containing a hydrophilic monomer of low water swelling ability and a UV stabilizer, on the polymer film surface that has been pre-treated with high frequency radiation, and photopolymerizing the solution thereon so as to improve the hydrophilic property, climate-resistibility, and blocking property of the polymer film.

2. Description of the Prior Art

Generally, polyolefin films have been widely used in the fields of agriculture and packaging because of their good mechanical properties, optical property, nontoxic property, and durable flexibility. However, since the surface of such conventional films are hydrophobic, the transparency of such conventional films is significantly reduced by condensation of moisture on the inner surface thereof, when used in a simple green house built by such polymer films, and the transmittance of sunlight through such films is reduced.

As a result, the yield of crops of vegetables in a simple green house is reduced and the period of harvest takes a longer time. Also, the temperature effect in the green house is reduced. If drops of water that are condensed on the surface of such films flow down onto the flower of a crop cultivated in the green house, the crop withers or fails to bear fruit.

Due to the hydrophobic property of the film surface, a coating material, such as water soluble ink, gelatin and so on, is difficult to coat onto the surface thereof. When such films are used for packaging foods, the foods may become spoiled or decayed due to the drops of water that form on the package film surface.

In order to avoid the above problems, the film surface has been modified as follows.

For example, there is a method for preparing a hydrophilic film by compounding polyethylene resin and a special surfactant, and a method for modifying the polyethylene film by coating a special surfactant on the surface thereof. However, since the surfactant used on the film is easily washed away by drops of water, the hydrophilic property of such films is reduced.

Recently, there has been developed a method for modifying such films by grafting a hydrophilic material on polyethylene film. The film modified by this method continuously maintains the hydrophilic property. However, discoloration of the film may occur since climate-resistibility is poor, and a blocking phenomena (sticking between the film) occurs on the film surface when a hydrophilic substance having a high water swelling ability, such as acrylic acid, methacrylic acid, acrylamide, methacrylamide, 2-hydroxyethylmethacrylate, and N-vinylpyrrolidone, is used.

SUMMARY OF THE INVENTION

Accordingly, it is an object of the present invention to provide an improved process for the preparation of a hydrophilic polymer film, which comprises pre-treating the polymer film surface with high frequency, coating thereon and photopolymerizing a photopolymerization solution containing a hydrophilic monomer of a low water swelling ability and a UV initiator.

Another object of the present invention is to provide a process for preparing a hydrophilic polymer film by coating a photopolymerization solution containing a hydrophilic monomer, a photo-initiating agent, a photo-enhancing agent, and a crosslinking agent on the surface of a film that is pre-treated with high frequency, and photopolymerizing the solution, wherein the photopolymerization solution contains about 1 to 40% by weight of a hydrophilic substance selected from the group consisting of acrolein, acrylonitrile, and acryloyl-chloride, and about 0.01 to 10% by weight of a UV stabilizer selected from the group of compounds having the following structural formulae (I), (II), and a mixture thereof, to form a hydrophilic layer on the surface by photoreaction.

Formulae I and II are represented as follows:

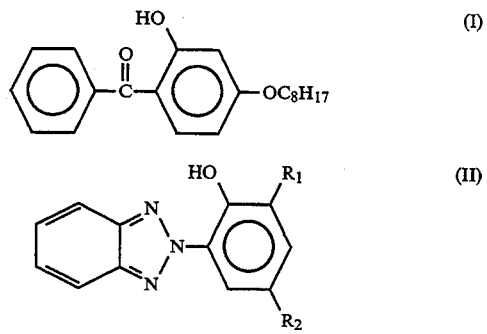

wherein, $R_1$ is hydrogen or t-butyl group, and $R_2$ is methyl or t-butyl group.

A further object of the present invention is to provide an apparatus for preparing a hydrophilic polymer film, which includes a coating equipment 1 and a light initiator 2 for a continuous process. The process comprises a pair of air supply hoppers, 4a and 4b, disposed between the coating equipment 1 and the light initiator 2, on the upper and lower side of a polymer film 5; the light initiator 2 contains a pair of UV lamps, 7a and 7b, disposed in a light reaction chamber 6; a solvent deflation fan 8 and cooling fans, 9a and 9b, are disposed at a side of chamber 6.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings.

FIG. 2 shows a pair of air supply hoppers in the apparatus in accordance with the present invention; and FIG. 3 shows a light initiator of the apparatus in accordance with the present invention.

DESCRIPTION OF THE PREFERRED EMBODIMENTS

Figure 1:
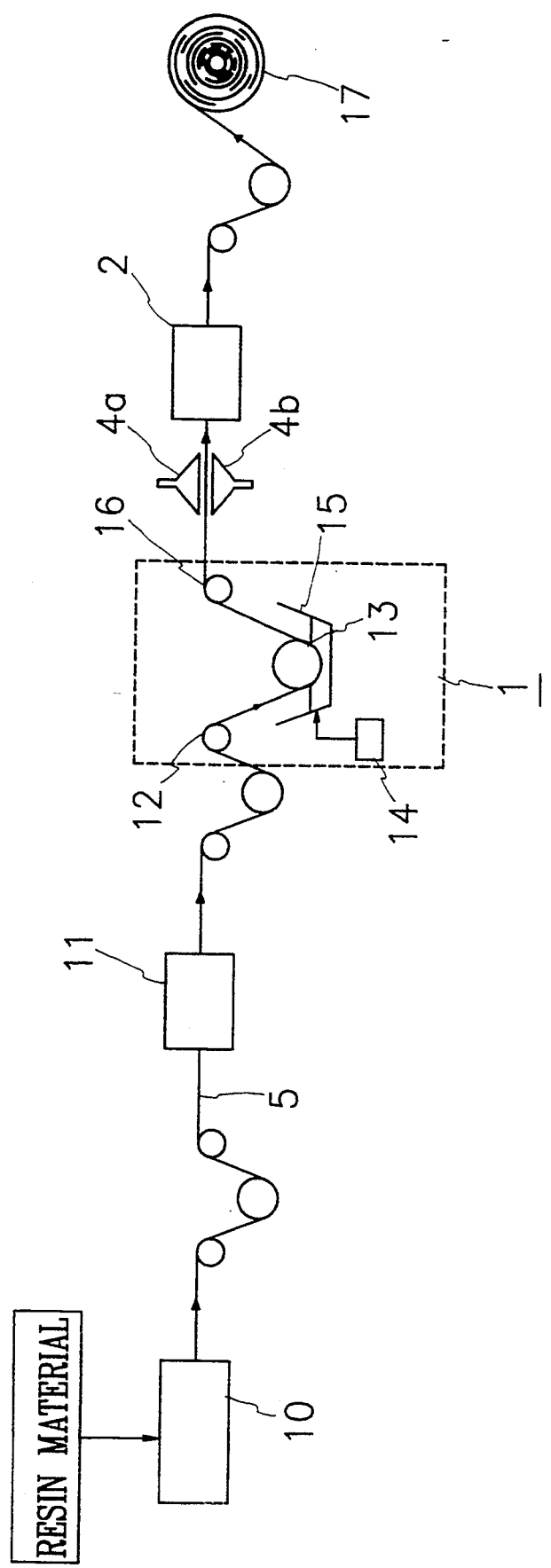
FIG. 1 schematically shows the process of preparing a hydrophilic polymer film and the apparatus thereof in accordance with the present invention.

Referring now in detail to the drawings for the purpose of illustrating preferred embodiments of the present invention, the process for preparing a hydrophilic polymer film as shown in FIGS. 1 and 3, comprises coating a thermoplastic film that is pre-treated with high frequency radiation with a polymerization solution.

The polymer film used in the present invention may be prepared from a thermoplastic polymer, such as polyethylene, polyvinylchloride, polypropylene, polystyrene, poly-4-methyl-1-pentane, polyamide-6, polycarbonate, polyethyleneterephthalate, or polypentadiene, by a conventional blow film extrusion method.

The photopolymerization solution comprises about 1 to 40% by weight of a hydrophilic monomer, about 0.01 to 5% by weight of a photo-initiating agent, and about 0.01 to 5% by weight of a crosslinking agent.

One member or a mixture selected from the group consisting of acrolein, acrylonitrile, and acryloylchloride can be used as the hydrophilic monomer. When the amount used is less than 1%, the water absorption effect of the film is reduced; if more than 40% is used, the characteristics of the film is reduced and the blocking property is increased.

In the present invention, acetophenone, isopropylbenzoinether, benzoperoxide, benzophenone, N,N'-azodiisobutyronitrile, and so on, may be used as the photo-initiating agent. Trimethylolpropanetrimethacrylate, trimethylolpropane-triacrylate and pentaerythritoltri-acrylate, etc., may be used as the crosslinking agent.

The photo-enhancing agent is used for reducing the oxygen effect during the polymerization process. For example, N-butyl amine, diethyl amine, ethylmethacrylate, triethylene, tetramine, ethanol amine, ethyl amine, trimethyl amine and mixtures thereof, may be used as the photo-enhancing agent.

In accordance with the present invention, about 0.01 to 10% by weight based on the weight of the photopolymerization solution of a UV stabilizer having the above structural formulae (I), (II), or a mixture thereof is used. When the amount of UV stabilizer is less than 0.01%, a stable effect cannot be achieved and the tensile strength of the film is reduced; when more than 10% of a UV stabilizer is used, the hydrophilic characteristic of the film is reduced.

To dissolve the hydrophilic monomer together with the above agents and the UV stabilizer, methylalcohol, ethylalcohol, acetone, water, hexane, methylethyl ketone, or a mixture thereof, may be used as the solvent.

The photopolymerization solution prepared by the above process is coated onto a polymer film that has been pre-treated with high frequency and having a surface tension of 36 to 60 Dyne/cm, wherein the film may be pre-treated with high frequency by a conventional method for the creation of activity points for graft-polymerization on the film surface.

Pretreatment with high frequency in this invention is carried out to create activity points on the polymer film surface in order to effect crosslinking and graft-photopolymerization in the atmosphere, within a short time after coating the polymer surface with the photopolymerization solution, and to improve the wetting property of the polymer film so that the photopolymerization solution can be uniformly coated onto the polymer film. Preferably, the treatment with high frequency is treatment with high frequency from a corona generator that is used in the atmosphere.

The high frequency wave used in treating the film surface in the present invention can be from 60 to 110 KHz. In order to obtain consistent surface properties, it is important to keep the frequency fixed. The frequency is preferably kept at 100 KHz, as shown in the following Example 1.

The amount of coating of the solution is adjusted to about 0.8 to 40 g/cm$^2$, and the residual amount of solvent on the coated film surface is from 0.07 to 3.6 g/m$^2$. For the photoreaction, the coated film surface is exposed to UV light at a temperature of about 10° to 70° C. for 1 to 600 seconds. The source of the UV light can be a Kern-arc light, a low pressure mercury lamp, a high pressure mercury lamp, a xenon lamp, a fluorescent lamp, a metal halogen lamp, a tungsten lamp, sunlight, and so on.

As a result of the photoreaction, a hydrophilic layer having a thickness of 0.01 to 1 $\mu$m is formed on the film surface.

The hydrophilic film modified according to the above process exhibits excellent hydrophilic property, climate-resistibility and blocking property, due to the use of a hydrophilic monomer having lower water swelling ability and a UV stabilizer of the above formula (I) and/or (II).

As shown in FIG. 1, the apparatus for modifying the polymer film according to the above process comprises equipment 10 for manufacturing film with a blow film extruder, high frequency treatment equipment 11 for pre-treating the film surface, coating equipment 1 for coating the photopolymerization solution of hydrophilic property and a light initiator 2 for photo-reacting the solution with the film surface, in a continuous system.

For the modification of the polymer film, film 5, manufactured by equipment 10 and pre-treated by equipment 11, passes along movable guide roll 12, and enters solution vessel 15, wherein the polymer film is contacted with the photopolymerization solution by coating roll 13 having a diameter of 1.5 to 3 times that of guide roll 12, in the photopolymerization solution supply device 14.

Thereafter, film 5 passes along another guide roll 16, and passes a pair of air supply hoppers, 4a and 4b, which supply air to the upper and lower sides of film 5 at the rate of 0.01 to 3 m/sec.

Air supply hoppers 4a and 4b, as shown in FIG. 2, have distributing plates 41a and 41b. The length thereof is 10 to 100 cm, the width thereof is 10 to 500 cm, and each distributing plate has a plurality of air supply apertures 3 with a diameter of 1 to 3 mm in a ratio of 1 aperture/cm$^2$.

Air supply hoppers 4a and 4b are placed at a distance of 5 to 20 cm from the upper and lower sides of film 5, which passes therebetween. Coating equipment 1 adjusts the coating amount of the hydrophilic substance so that the application of the photopolymerization solution at 0.8 to 40 g/m² is maintained, by movable guide rolls 12 and 16, which move up and down. Supply hoppers 4a and 4b equally supply air to the film surface, and the residual amount of solvent in the photopolymerization solution coating is adjusted to 0.07 to 3.6 g/m² on the film surface.

As shown in FIG. 3, film 5, which has been coated by the photopolymerization solution, passes through light reaction chamber 6, which has slits of 2 to 10 mm on both sides of the passage of film 5, and having interior aluminum reflection plate 21. In the interior of chamber 6, a pair of UV lamps, 7a and 7b, are placed at a distance of 5 to 50 cm from film 5 for irradiating UV light of 30 to 160 W/cm, and are protected by lamp protecting tubes, 22a and 22b, having a diameter of 50 to 100 mm. Cooling fans, 9a and 9b, are disposed in front of lamp protecting tubes 22a and 22b. Further, a solvent deflation fan 8 is placed at a side of chamber 6 to accommodatingly deflate the volatilized solvent.

According to the present invention, the exposure time of film 5 in light initiator 2 is from 1 to 600 sec. When the exposure time is less than 1 sec, photoreaction on the film surface does not occur, and when more than 600 sec, the characteristics of the film is reduced by the UV light. The exposing temperature may be controlled by cooling fans 9a and 9b and temperature auto controller 24, which is connected with sensor 23 to maintain the temperature of chamber 6 at 10° to 70° C. When the temperature is less than 10° C., film 5 is not dried, and when more than 70° C., the mechanical properties of the film are changed.

Under the above condition, a photoreaction occurs between the film and the hydrophilic substance coated on the film surface, to form a hydrophilic layer. The product is then transferred to rolling roll 17.

Film 5, modified in accordance with the process and the apparatus of the present invention, has a hydrophilic layer, and has a durability of more than 90 days for the hydrophilic property.

The present invention may be accomplished by factors of the pre-treatment of the surface, the percisive coating of the hydrophilic substance, the adjustment of solvent amount, the photoreaction condition and the speedy removal of volatile solvent.

Since the film according to this invention has excellent block property, hydrophilic property, and climate-resistibility, it can be used as a packaging film for goods or foods and in agriculture, so that condensation of water does not occur on the film surface and the transparency of the film is not reduced.

The present invention will now be described in more detail in connection with the following examples which should be considered as being exemplary and not limiting the present invention.

EXAMPLE 1

The hydrophilic polymer film was produced as follows.

| | |
|---|---|
| Polymer Film | |
| Low-density polyethylene: | |
| melt index | 2,4 |
| density | 0.924 t/cm³ |
| thickness | 30 μm |
| High Frequency Treatment of the Film | |
| Capacity of a generator (power): | 7.5 Kw |
| Output voltage: | 160 V |
| Frequency: | 100 KHz |
| Length of electric pole: | 1 m |
| Interval between film and electric pole | 1 mm |
| The speed of treatment (rolling - rate of the film): | 5 m/min |
| Generator maker: Boosung Electric Co. Ltd, Korean Company | |
| *Note that if the frequency of 100 KHz is made, if the remaining conditions are satisfied. | |
| Photopolymerization Solution of Photopolymerizable Composition | |
| Acrylonitrile | 150 g |
| Acetophenone | 50 g |
| Pentaerythritol triacrylate | 5 g |
| Triethylamine | 5 g |
| UV stabilizer (formula I) | 5 g |
| Solvent (methyl ethylketone) | up to 720 g |
| Conditions for the General Process | |
| Coating amount of photopolymerization solution | 8 g/m² |
| Diameter ratio for guide roll and coating roll | 1:2 |
| Rate of air supplying from the hopper | 1.4 m/sec |
| Maintaining solvent | 1.5 g/m² |
| Rolling rate of the film | 5 m/min |
| Conditions of Photo-reaction | |
| Output power of UV lamp | 3 Kw |
| Width of radiation | 1 m |
| Distance of the lamp from the film | 20 cm |
| Chamber size | 1.1 × 1.2 × 0.6 mm |
| Exposing time | 12 sec |
| Temperature in chamber | 50° C. |

For the film modified under the above condition, the tensile strength, the elongation and the contact angle of water droplets on the film surface are shown in the following Table 1.

EXAMPLE 2

A polyethylene film having a thickness of 100 μm was pre-treated with high frequency.

33 g acrolein, 3 g benzophenone, 5 g pentaerythritol triacrylate, 2 g ethanol amine, 2 g UV stabilizer having the above formula (II) (0.61 wt % based on the total of photopolymerization solution) were dissolved in solvent of normal hexane, to obtain a photopolymerization solution of 330 g. A film was produced as in Example 1, except that the coating of the above solution had a thickness of 50 μm on the pre-treated film surface.

Properties for the modified film are listed in Table 1.

EXAMPLE 3

A polyethylene film having a thickness of 50 μm was pre-treated with high frequency. 18 g acryloylchloride, 4 g benzoinperoxide, 3 g trimethylolpropanetriacrylate, 3 g triethylenetetramine and 3 g UV stabilizer (0.38 wt %) having a weight ratio of 50:50 of compounds having formula (I) and formula (II), were dissolved in methylisobutylketone to obtain a photopolymerization solution of 800 g. A film was modified as in Example 1, except that the coating of the above solution had a thickness of 5 μm on the pre-treated film surface.

Properties for the modified film are listed in Table 1.

COMPARATIVE EXAMPLE 1

The film was modified as in Example 1, except that a UV stabilizer was not used in the photopolymerization solution.

Properties for the modified film are listed in Table 1.

COMPARATIVE EXAMPLE 2

The film was modified as in Example 2, except that a UV stabilizer was not used in the photopoly-erization solution.

Properties for the modified film are listed in Table 1.

COMPARATIVE EXAMPLE 3

The film was modified as in Example 3, except that a UV stabilizer was not used in the photopolymerization solution.

Properties for the modified film are listed in Table 1.

COMPARATIVE EXAMPLE 4

The film was modified as in Example 1, except that a pre-treated polyethylene film having a thickness of 50 μm and a photopolymerization solution having 0.07 g of a UV stabilizer having formula (I) (0.0097 wt %) were used.

Properties of the modified film are listed in Table 1.

COMPARATIVE EXAMPLE 5

The film was modified as in Example 1, except that a pre-treated polyethylene film having a thickness of 50 μm and a photopolymerization solution having 80 g of a UV stabilizer having formula (II) (11.1 wt %) were mixed.

Properties of the modified film are listed as the Table 1.

TABLE 1

| Section | Length direction before the test | | Length direction after the test | | Width direction before the test | | Width direction after the test | | Climate resistibility | Hydrophilic property Contact angle (Degree) | Blocking property (kg/cm$^2$) |
|---|---|---|---|---|---|---|---|---|---|---|---|
| | Tensile strength (kg/cm$^2$) | Elongation | Tensile strength (kg/cm$^2$) | Elongation | Tensile strength (kg/cm$^2$) | Elongation | Tensile strength (kg/cm$^2$) | Elongation | | | |
| Example 1 | 168 | 231 | 166 | 229 | 163 | 360 | 162 | 358 | ◯ | 5 | 65 |
| Example 2 | 196 | 382 | 195 | 380 | 181 | 472 | 180 | 470 | ◯ | 5 | 80 |
| Example 3 | 182 | 288 | 180 | 286 | 176 | 386 | 175 | 384 | ◯ | 8 | 75 |
| Comparative example 1 | 168 | 231 | 144 | 158 | 163 | 360 | 126 | 223 | X | 15 | — |
| example 2 | 196 | 382 | 165 | 251 | 181 | 472 | 159 | 348 | X | 5 | — |
| example 3 | 182 | 288 | 153 | 189 | 176 | 386 | 141 | 243 | X | 10 | — |
| example 4 | 173 | 268 | 140 | 165 | 170 | 371 | 138 | 221 | X | 15 | — |
| example 5 | 175 | 271 | 173 | 269 | 171 | 379 | 170 | 378 | ◯ | 83 | — |

◯: good
X: inferiority

In Table 1, the climate-resistibility was tested at the temperature of 30° C. for 72 hours by weather-ometer of Atlas, and then the tensile strength was measured according to KS M-3504 by Tensile Strength Tester of Instoron.

The blocking property was measured according to ASTMD 1983-67. The hydrophilic property was tested by contact angle meter of method for optical cast shadow, and then it was decided that the film has a good hydrophilic property when the contact angle is less than 20 degree.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

We claim:

1. A process for preparing a hydrophilic polymer film which comprises the steps of:

coating the surface of a polymer film pre-treated with 60–110 KHz high frequency radiation with a photopolymerization solution containing 1 to 40% by weight of a hydrophilic monomer, a photo-initiating agent, a photo-enhancing agent, a cross-linking agent and 0.01 to 10% by weight of a UV stabilizer, wherein said hydrophilic monomer is selected from the group consisting of acrolein, acrylonitrile, acryloylchloride and a mixture thereof, said photo-enhancing agent is selected from the group consisting of n-butyl amine, diethyl amine, ethylmethacrylate, triethylene, tetramine, ethanol amine, ethyl amine, trimethyl amine and mixture thereof, and said UV stabilizer is selected from the group consisting of formula (I), (II) and a mixture thereof,

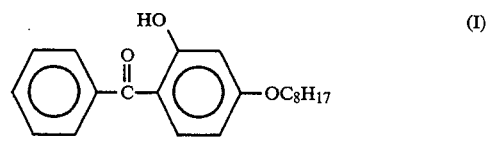

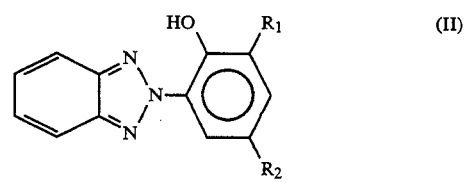

wherein $R^1$ is a hydrogen or t-butyl group, and $R^2$ is methyl or t-butyl group, and photopolymerizing said photopolymerization solution and forming a hydrophilic polymer layer on the surface of said polymer film by a photo-reaction.

2. A process for preparing a hydrophilic polymer film by coating the surface of a polymer film with a photopolymerization solution consisting essentially of a hydrophilic monomer, a photo-initiating agent, a photo-enhancing agent selected from the group consisting of n-butyl amine, diethyl amine, ethylmethacrylate, triethylene, tetramine, ethanol amine, ethyl amine, trimethyl amine and a mixture thereof, a crosslinking agent and a UV stabilizer, drying said photopolymerization solution coated on the film, and photopolymerizing said photopolymerization solution to form a hydrophilic polymer layer on the surface of said polymer film by a photo-reaction carried out by irradiation to a UV light, the improvement which comprises the successive steps of:

pre-treating the surface of the polymer film with 60–110 KHz of high frequency radiation before coating the photopolymerization solution;

coating the pre-treated surface of the polymer film with the photopolymerization solution which contains 1 to 40% by weight of the hydrophilic monomer selected from the group consisting of acrolein, acrylonitrile, acryloylchloride and a mixture thereof and 0.01 to 10% by weight of the UV stabilizer selected from the group consisting of formula (II) and a mixture thereof

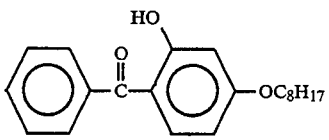

(I)

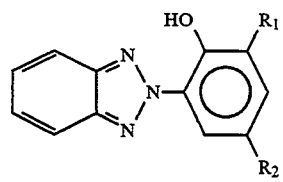

(II)

wherein $R^1$ is a hydrogen or t-butyl group, and $R^2$ is methyl or t-butyl group;

drying the coated photopolymerization solution by uniformly supplied air at a rate of 0.01 to 3 m/sec at a distance of 5 to 20 cm from a pair of air supply hoppers having a number of apertures with a diameter of 1 to 3 mm in a ratio of 1 aperture/cm²; and photopolymerizing by irradiating 30 to 160 W/cm of the UV light at a distance of 5 to 50 cm from the film surface.

* * * * *